United States Patent

[11] 3,565,340

| [72] | Inventors | Harry Mathais Meinert<br>Des Moines;<br>Vernis Henry Meyer, Granger; Barbara Susan Coughenour, Carlisle; Francis Edward Schlueter, Des Moines, Iowa |
|---|---|---|
| [21] | Appl. No. | 829,929 |
| [22] | Filed | June 3, 1969 |
| [45] | Patented | Feb. 23, 1971 |
| [73] | Assignee | Deere & Company<br>Moline, Ill. |

[54] FOLDING BOOM
12 Claims, 6 Drawing Figs.

[52] U.S. Cl. .................................................. 239/168
[51] Int. Cl. .................................................. B05b 1/20
[50] Field of Search .......................................... 239/164, 165, 166, 167, 168, 169

[56] References Cited
UNITED STATES PATENTS

| 3,055,594 | 9/1962 | Nansel | 239/167X |
| 3,329,030 | 7/1967 | Dijkhof | 239/167X |
| 3,425,628 | 2/1969 | Reams | 239/168 |
| 3,504,857 | 4/1970 | Ballu | 239/168 |

*Primary Examiner*—M. Henson Wood, Jr.
*Assistant Examiner*—Thomas C. Culp, Jr.
*Attorneys*—H. Vincent Harsha, Harold M. Knoth, William A. Murray and John M. Nolan ABSTRACT: A sprayer boom having a hydraulic cylinder and sprocket apparatus for folding the boom through a 180°. The boom also includes a double-folding action which permits a relatively long boom to be folded into a compact size for transport, while staying within highway width limitations and maintaining a reasonable vertical clearance.

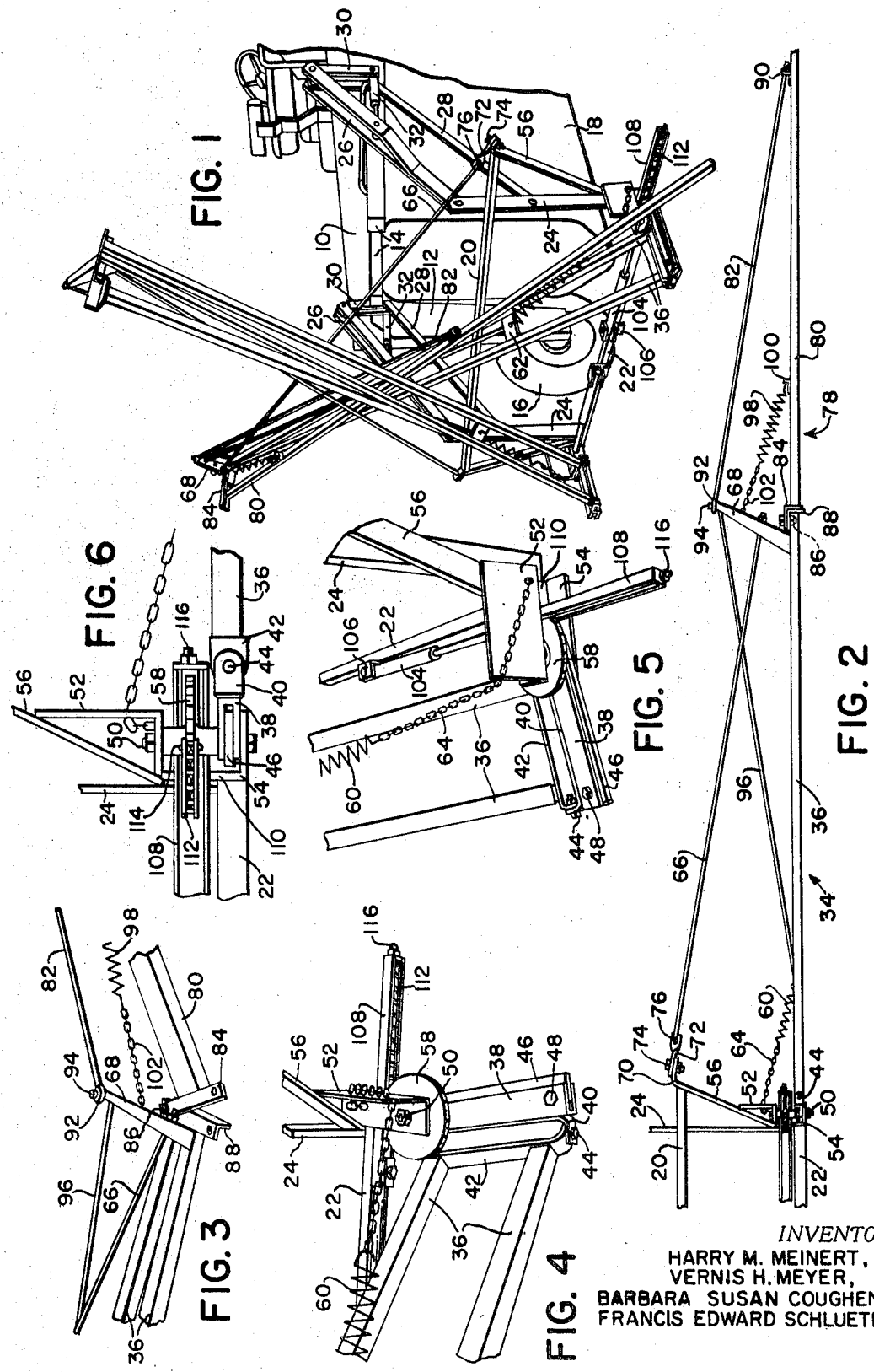

3,565,340

FOLDING BOOM

BACKGROUND OF THE INVENTION

The present invention relates generally to sprayer booms, and more particularly relates to a novel boom which is foldable into a compact size for transport.

Due to the extreme lengths now employed in sprayer booms, it has been found to be necessary to construct a boom from a plurality of sections, a main section being carried by the vehicle and the outer sections being pivotally mounted on the main section for movement between extended working positions and folded transport positions. The outer sections of the booms have been folded to a number of different positions. Some booms have been folded to a vertical position which not only had the disadvantage of exposing the operator to toxic chemicals dripping from the nozzles, but also extended the booms beyond an acceptable vertical clearance. Other booms have been pivoted to a trailing position. This had the disadvantage of creating a longer implement than could easily be handled and which required an unwarranted amount of space for storage. Still other booms have been pivoted to a position in which they extend alongside of the spraying vehicle, but these booms could not be used on a small trailer-type sprayer which has a relatively short fore-and-aft dimension.

SUMMARY OF THE INVENTION

An object of the present invention is to provide a sprayer boom having a double-folding action that permits a relatively long boom to be folded into a compact size for transport and which extends across one end of a spraying vehicle when in the folded or transport position.

A further object of the present invention is to provide a folding apparatus for a sprayer boom which will pivot the boom from an extended working position through an arc of approximately 180° to a folded transport position in which it extends generally diagonally across one end of a spraying vehicle.

Still another object of the present invention is to provide a sprayer boom having a double-folding action in which the outer hinge has a geometry such that the outer section of the boom will be held in either the extended working position or folded transport position.

Yet another object of the invention is to provide an improved folding apparatus for a sprayer boom.

Another object of the present invention is to provide a sprayer boom which can be used on all sprayers regardless of whether they are self-propelled, tractor mounted or trailer types.

The above objects are obtained by providing a boom having a main section carried at one end of a vehicle, an intermediate section pivotally connected to the main section for movement about a first hinge including a horizontal axis and upper and lower generally vertical axes which are offset from one another, and an outer section pivotally connected to the intermediate section for movement about a second hinge including upper and lower generally vertical axes which are offset from one another. The axes of the second hinge are offset such that the weight of the outer section and hinge geometry combine to releasably hold the outer section in either an extended working position or a folded transport position in which it extends back along the length of the intermediate section. The vertical axes of the first hinge are offset such that, as the intermediate section is moved from an extended working position to a folded transport position in which it extends back along the main section, it is pivoted upwardly about the horizontal axis causing the intermediate and outer sections to extend diagonally across the end of the vehicle.

A folding apparatus for the intermediate section of the boom is also provided which will fold the section through approximately 180° without the use of complicated linkages. The folding apparatus includes a channel member slidably carried by the main section for reciprocal movement, a hydraulic cylinder connected between the main section and channel member, a sprocket wheel secure to the intermediate section for rotation about the lower vertical axis of the first hinge and extending between the legs of the channel member, and a roller chain secured between one end of the channel and the periphery of the sprocket wheel. The chain is wrapped about the sprocket wheel when the intermediate section is extended, and extension of the cylinder causes the chain to be pulled off of the sprocket wheel into the channel member to thereby rotate the sprocket wheel and move the intermediate section to the folded position. The chain provides a one-way connection so that the folding apparatus will not prevent the intermediate section from breaking away from its extended position in the event an obstruction is encountered.

The above and additional objects and advantages will become apparent to those skilled in the art from a reading of the following description when read in conjunction with the accompanying drawing.

BRIEF DESCRIPTION OF THE DRAWING

In the drawing:

FIG. 1 is a perspective view of a sprayer boom in its folded transport position;

FIG. 2 is a fragmentary rear elevational view of one side of the boom illustrated in FIG. 1, the boom being illustrated in its extended position;

FIG. 3 is an enlarged perspective view of the outer hinge of the boom illustrated in FIG. 1;

FIGS. 4 and 5 are enlarged perspective views of the inner hinge and folding apparatus of the boom illustrated in FIG. 1; and FIG. 6 is an enlarged rear elevational view of the inner hinge and folding apparatus in an extended condition.

DESCRIPTION OF THE PREFERRED EMBODIMENT

Referring now to the drawing, a sprayer boom is illustrated as being mounted on the rear portion of a self-propelled spraying vehicle. The vehicle includes a transversely-extending rear beam assembly 10 and a drop housing 12 secured to each of the outer ends of the beam assembly. The beam assembly 10 is rigidly secured to a pair of longitudinally-extending beams 14 which form a part of the vehicle chassis. The rear portion of the vehicle is carried by ground wheels 16 rotatably mounted on the lower portion of the drop housings while the forward portion of the vehicle is supported by an additional wheel (undisclosed) in any suitable manner. The vehicle also includes a solution tank 18 which may be carried under and secured to the chassis of the vehicle in any suitable manner.

The boom includes a generally vertically-extending main section made up of upper and lower transversely-extending frame members 20 and 22 which are interconnected by vertically-extending frame members 24. The main section of the boom is secured to the vehicle through pairs of upper and lower arms 26 and 28 which form a parallel linkage. The inner ends of the arms 26 and 28 are pivotally secured to the upper and lower ends, respectively, of brackets 30 mounted on the vehicle in any suitable manner. The outer ends of the links 26 and 28 are pivotally connected to the vertical frame members 24. Hydraulic cylinders 32 act between the lower portions of the brackets 30 and the upper links 26 intermediate the ends thereof to raise and lower the boom. The parallel linkage maintains the main section of the boom in a substantially vertical plane while raising and lowering the same.

As best seen in FIG. 1, an intermediate and outer boom section are mounted on each end of the main section, but in the following description, only the right-hand intermediate and outer sections when viewing the boom from the rear will be described. The description of the left-hand intermediate and outer sections are omitted for simplicity purposes since they are similar in all aspects to the right-hand section.

The intermediate section is indicated generally at 34 and includes a pair of boom members 36 which are spaced apart at their inner ends and converge inwardly toward their outer ends. The inner ends of the boom members 36 are pivotally connected to a channel member 38 by a pair of U-shaped members 40 and 42. The bight portions of the U-shaped members 40 and 42 are secured to the bight portion of the channel member 38 and the inner ends of the boom members 36, respectively, and have their legs pivotally interconnected by pivot bolts 44. The channel member 38 is pivotally mounted on the lower portion of the main section for movement about either one of a pair of generally vertical axis. To this end, a pivot arm 46 is mounted between the legs of the channel member 38 by a pivot bolt 48 which extends through the legs of the channel member 38 and through one end of the arm 46. The opposite end of the arm 46 extends beyond the channel member 42 and is pivotally mounted by a bolt 50 between a pair of brackets 52 and 54 carried by a lower portion of the main section of the boom. The lower bracket 54 is secured to the end of the lower frame member 22 and the upper bracket 52 is secured to an end frame member 56 which extends between the ends of the upper and lower frame members 20 and 22. For a purpose which will be explained hereinafter, a sprocket wheel 58 is rigidly secured to the end of the arm 46 which extends beyond the channel member 38 and is rotatable about the pivot bolt 50.

From the foregoing description, it can be seen that the intermediate section 34 of the boom can pivot in a vertical plane about a horizontal axis defined by pivot bolts 44, can be pivoted forwardly from the extended position illustrated in FIG. 2 about a vertical axis defined by the pivot bolt 48, and can be pivoted rearwardly from the extended position about a vertical axis defined by the pivot bolt 50. The intermediate section of the boom is normally biased toward and maintained in the extended position by a centering spring 60 which is tensioned between a brace 62 (FIG. 1) secured between the boom members 36 and a chain 64 adjustably anchored to the bracket 52 in any suitable manner.

The intermediate section 34 of the boom is prevented from dropping about the horizontal axis by a boom supporting member 66. The supporting member 66 includes an elongated rodlike member having one end anchored to a generally upright support 68 mounted at the outer end of the intermediate section 34. The opposite end of the support member 66 is pivotally connected to an upper portion of the main section. To this end, the upper portion of the end frame member 56 of the main section is bent outwardly at its upper end to form an ear 70 to which one end of a link 72 is pivotally connected by a bolt 74. The link 72 is relatively short, is twisted through 90° intermediate its ends, and has one end pivotally connected to the support member 66 by a pivot pin 76. The pivot bold 74 forms a generally upright axis about which the supporting member 66 can swing as the intermediate section swings about either one of the vertical axes formed by the pivot bolts 48 and 50, and the pivot pin 76 forms a horizontal axis about which the supporting member 60 can swing as the intermediate section moves about the horizontal axis formed by the pivot bolts 44. It should be noted that the upright axis formed by the pivot bolt 74 is positioned transversely outwardly of the axes formed by the pivot bolts 48 and 50 so as the intermediate section 34 swings about either one of the vertical axes 48 and 50 and the supporting member 66 swings about the upright axis 74 from the extended position illustrated in FIG. 2 toward a folded position, the intermediate section is pivoted upwardly about the horizontal axes so that when folded through 180°, it extends diagonally across the end of the vehicle. The upright axis formed by the pivot bolt 74 is also positioned midway between the vertical axes defined by the pair of bolts 48 and 50 when the intermediate section is in the extended position so that the weight of the intermediate section as well as that of an outer section to be described hereinafter helps to maintain the intermediate section in its extended position.

The outer section of the boom is indicated generally at 78 and includes a boom member 80 and a supporting member 82. An elongated right-angle bracket 84 has one of its legs secured intermediate its ends to the inner end of the boom member 80 and is pivotally mounted at one of its ends by a pivot bolt 86 to an end of a corresponding right-angle bracket 88 which interconnects the outer ends of the intermediate boom members 36. The brackets 84 and 88 are also apertured at their opposite ends so that the pivot bolt 86 may be used to mount the boom member 80 for movement to either side of the extended position illustrated in FIG. 2.

The support member 82 takes the form of an elongated rod and has one end secured to a bracket 90 mounted on the boom member 80 remotely from the inner end thereof, and at its opposite end is provided with an eye 92 which is positioned over a stub shaft 94 on the upper end of the support 68. Since much of the weight of the outer section 78 of the boom is placed on the upper end of the support 68, a brace member 96 is provided between the upper end of the support 68 and the brace 62 which extends between the frame members 36 of the intermediate section. The pivot bolt 86 and stub shaft 94 provide vertical pivots about which the boom member 80 and supporting member 82 can pivot to a folded position in which they extend generally back along the length of the intermediate section 34 as illustrated in FIG. 1. When the intermediate section 34 is in the extended position shown in FIG. 2, the vertical axis formed by the stub shaft 94 is positioned outwardly of the axis formed by the bolt 86 a slight distance so that as the outer section is pivoted to its folded position, the boom member 80 will be positioned above the boom members 36 a short distance so that any spray nozzles mounted on the boom member 80 will not be damaged by engagement with the boom members 36. It should also be noted that the pivot bolt 86 is positioned to the side of a vertical plane extending through the centerline of the intermediate section 34 a distance slightly greater than the distance which the stub shaft 94 is positioned outwardly of the pivot 86 so that the relative positions of the stub shaft 94 and pivot bolt 86 combined with the weight of the outer section hold the outer section in either its extended or folded position. A centering spring 98 tensioned between bracket 100 mounted on the boom member 80 and a chain 102 adjustably anchored to the upright support 68 also helps to maintain the outer section 78 in either the extended or folded positions.

The folding apparatus for the intermediate section 34 can best be seen in FIGS. 4—6, and includes a single-acting hydraulic cylinder 104 having its anchor end pivotally secured to the frame member 22 by a bracket 106 and a channel member 108 slidably mounted on the main section and secured to the rod end of the cylinder. The channel member 108 has its open side facing the sprocket wheel 58 so that the sprocket wheel extends between the legs thereof and prevents vertical movement of the channel member. Movement of the channel member 108 away from the sprocket wheel 58 is prevented by a vertical leg 110 on the bracket 54 which engages the closed side of the channel member. A chain member such as a roller chain 112 has one of its ends secured to the periphery of the sprocket wheel 58 by a pin 114 and has its opposite end secured between the legs of the channel member 108 near the end remote from the connection with the cylinder 104 by a bolt 116. When the intermediate section 34 is in the extended position, the chain 112 is wrapped about the sprocket wheel 58 and extension of the cylinder 104 causes the channel member 108 to move outwardly to rotate the sprocket wheel 58 and intermediate section 34 through approximately 180° to the folded position illustrated in FIG. 1. The chain 112 provides a one-way connection between the channel member 108 and the sprocket wheel 58 so that in the event an obstruction is encountered when the intermediate section 34 is in the extended position, it can pivot about the bolt 50 by buckling the chain 112. When the intermediate section 34 is in the folded position illustrated in FIG. 1 and fluid pressure is exhausted from the cylinder 104, the centering spring 60 will return the intermediate section to the extended position illustrated in FIG. 2.

The operation of the above-described sprayer boom is as follows: To prepare the boom for field operation, it is only necessary to exhaust pressure from the cylinder 104 so that the centering spring 60 pivots the intermediate section 34 about the bolt 50 to the extended position. The operator then manually moves the outer section 78 about the pivot 86 to the extended position. If during operation an obstruction is encountered by the boom, it can pivot rearwardly about the bolt 50 by buckling the chain 112. If an obstruction is encountered during rearward movement of the vehicle, the outer section 78 can pivot about the bolt 86 or the intermediate section can pivot about the bolt 48 depending upon which section actually strikes the obstruction. If the boom is mounted on the front of the spraying vehicle, only the outer section of the boom would break away if the outer end of the boom encountered an obstruction while spraying, thus leaving the intermediate section of the boom in position to maintain an even spray pattern.

As illustrated, the outer section 78 of the boom is longer than the intermediate section 34 and therefore must be folded forwardly about the bolt 86 so that when the intermediate section 34 is folded to the transport position, the outer end of the outer section 78 will not get caught under the lower frame member 22 of the main section of the boom. However, if the outer section 78 of the boom is constructed to have a length less than the intermediate section 34, the pivot bolt 86 can be moved to the opposite end of the brackets 84 and 88 so that even though the boom is mounted on the rear of a vehicle, only the outer section of the boom will break away upon striking an obstruction to thereby leave the intermediate section in position to maintain an even spray pattern.

The folding apparatus also serves to swing both the intermediate and outer sections of the boom about the pivot bolt 50 when making a turn close to a fence line or the like. The enables the sprayer operator to move to the extreme ends of a field before making a turn to begin the next pass down the field.

While a single preferred embodiment of the invention has been described and illustrated, various modifications within the underlying principles of the invention can be made without departing from the spirit of the invention.

We claim:

1. A foldable sprayer boom comprising: a main section adapted to be attached to one end of a vehicle; an outer section having one end secured to the main section for pivotal movement about a generally vertical axis between extended and folded positions; means biasing the outer section to the extended position; a sprocket wheel fixedly secured to the main section for rotation about the vertical axis; extensible and retractable means mounted on the main frame and operatively engaging the sprocket wheel to rotate the sprocket wheel in a folding direction upon movement of the extensible and retractable means in one direction; whereby, upon movement of the last-mentioned means in the one direction the outer section is pivoted about the vertical axis to the folded position and upon movement of the last-mentioned means in the opposite direction the biasing means returns the outer section to the extended position.

2. The sprayer boom set forth in claim 1 wherein the extensible and retractable means has a one-way engagement with the sprocket wheel.

3. The sprayer boom set forth in claim 2 wherein the extensible and retractable means includes hydraulic cylinder means having one end anchored on the main section; an elongated channel member slidably carried by the main section with the sprocket wheel extending between the legs of the channel member; one end of the channel member being secured to the other end of the cylinder means; chain means having one end secured to the sprocket wheel and another end secured to the other end of the channel member; the chain means being wrapped about the sprocket wheel when the outer section is in the extended position and extending between the legs of the channel member when the outer section is in the folded position.

4. A foldable sprayer boom comprising: a main section adapted to be carried at one end of a vehicle; an outer section; means mounting the outer section to the main section for pivotal movement about either one of a pair of spaced generally vertical axes positioned on opposite sides of the main section; the outer section being movable about one of the axes between extended and breakaway positions and being movable about the other axis between extended and either a folded or breakaway position; means biasing the outer section toward the extended position from both the folded and breakaway positions; an elongated channel member slidably mounted on the main section; roller means fixedly secured to the outer section for rotation about the other axis; elongated flexible means having one end secured to the periphery of the roller means and another end secured to one end of the channel member; and extensible and retractable means operatively connected between the channel member and the main section to move the channel member relative to the sections, whereby movement of the channel member in one direction rotates the outer section about the other axis to the folded position and movement of the channel member in the opposite direction permits the biasing means to return the outer section to the extended position.

5. The sprayer boom set forth in claim 4 wherein the roller means extends between the legs of the channel member.

6. The sprayer boom set forth in claim 5 wherein the roller means includes a sprocket wheel and the flexible means is a roller chain.

7. Spraying apparatus comprising: a vehicle; a multisection boom including a main section carried at one end of the vehicle, an intermediate section, and an outer section; the main section extending transversely of the vehicle and having upper and lower portions; the intermediate and outer sections having inner and outer ends; means pivotally connecting the inner end of the intermediate section to the lower portion of the outer section for movement about a generally horizontal axis between raised and lowered positions and movement about a generally vertical axis through approximately 180° between extended and folded positions; an intermediate section-supporting member having one end secured to the intermediate section remotely from the inner end and an opposite end secured to the upper portion of the main section for pivotal movement about a generally upright axis located outwardly of the vertical axis whereby swinging movement of the intermediate section from an extended position to a folded position causes the intermediate section to pivot upwardly about the horizontal axis; means mounting the inner end of the outer section to the outer end of the intermediate section for pivotal movement through an arc of approximately 180° about a second generally vertical axis between extended and folded positions; a generally upright support mounted on the outer end of the intermediate section; an outer section-supporting member having one end secured to the outer section remotely from the inner end and an opposite end pivotally secured to the upright support for movement about a third generally vertical axis between the extended and folded positions, whereby the outer section is foldable back along the intermediate section, the intermediate section is foldable back along the main section, and when both sections are in the folded positions they extend generally diagonally across the end of the vehicle.

8. Spraying apparatus as set forth in claim 7 wherein the second vertical axis is positioned to one side of a vertical plane through the longitudinal centerline of the intermediate section and the third vertical axis is positioned in the plane whereby the weight of the outer section and the relative positions of the second and third vertical axes serve to releasably hold the outer section in either its extended or folded positions.

9. The spraying apparatus set forth in claim 8 further including centering spring means acting between the main and intermediate sections to bias the intermediate section toward and normally hold the intermediate section in the extended position.

10. The spraying apparatus set forth in claim 9 further including a power-operated boom-folding means connected between the main and intermediate sections to move the intermediate from the extended to the folded positions.

11. The spraying apparatus set forth in claim 10 wherein the boom-folding means has a one-way connection between the main and intermediate sections.

12. Spraying apparatus comprising: a vehicle; a multisection boom including a main section carried at one end of the vehicle, an intermediate section, and an outer section; means pivotally mounting the inner end of the intermediate section to the main section for movement between a first position in which it extends outwardly of the main section and a second position in which it extends back along the main section; means pivotally mounting the inner end of the outer section to the outer end of the intermediate section for movement through an arc of approximately 180° between extended and folded positions; the last-mentioned means including upper and lower generally vertical pivots with the upper pivot positioned generally in vertical planes through the longitudinal centerlines of the intermediate and outer sections and the lower pivot positioned to one side of the vertical planes through the longitudinal centerlines of the intermediate and outer sections, whereby the relative positions of the upper and lower vertical axes and the weight of the outer section act to releasably hold the outer section in either its extended or folded positions.